United States Patent [19]

Wetherald

[11] Patent Number: 4,945,670
[45] Date of Patent: Aug. 7, 1990

[54] DOWN RIGGER BREAKAWAY RELEASE DEVICE

[76] Inventor: Milo N. Wetherald, 6240 Piedmont Rd., Port Angeles, Wash. 98362

[21] Appl. No.: 445,402

[22] Filed: Dec. 14, 1989

[51] Int. Cl.$^5$ .............................................. A01K 91/00
[52] U.S. Cl. ................................................... 43/43.12
[58] Field of Search ............................ 43/43.12, 43.1

[56] References Cited

U.S. PATENT DOCUMENTS

| | | | |
|---|---|---|---|
| 2,958,973 | 11/1960 | May | 43/43.12 |
| 3,816,954 | 6/1974 | Bissonette | 43/43.12 |
| 3,930,330 | 1/1976 | Black | 43/43.12 |
| 4,173,091 | 11/1979 | Emory | 43/43.12 |
| 4,221,068 | 9/1980 | Roemer, Jr. | 43/43.12 |

Primary Examiner—Richard K. Seidel
Assistant Examiner—James Miner
Attorney, Agent, or Firm—Russell W. Illich

[57] ABSTRACT

A release device used within a down rigger fishing assembly for easy attachment to a down rigger cable and efficient release of a fishing line when a fish strikes bait at the end of the line. The device is made of a single body having a groove at one end for mating with a down rigger cable and opposing hooks at either end of the groove for securing the cable with the groove. At an opposite end of the body is a trigger shaped as a bell crank lever pivotally attached to the body and having a pair of arms to hold a fishing line therebetween when the trigger is closed into the body and for releasing the device when the trigger is pivoted outwardly away from the body. A resilient and adjustable catch is provided on the body which holds the trigger in a closed position.

2 Claims, 2 Drawing Sheets

DOWN RIGGER BREAKAWAY RELEASE DEVICE

BACKGROUND OF THE INVENTION

The present invention relates to release devices for use with a down rigger line used when trolling. These devices allow a plurality of fishing lines to be held by a weighted down rigger cable. When a fish strikes on one of the lines the release mechanism releases the fishing line automatically or upon remote control from some signal to the person controlling the line(s). The release mechanism is required by law to allow "game" fisherman to fish more than one line but preventing the fisherman from harvesting several fish at the same time as a "commercial" fisherman does.

There are several disadvantages with the release mechanisms currently used by fishermen. The first is that the attachment of these release devices to the down rigger line is often cumbersome or extremely inflexible allowing the devices to be attached only at certain points on the line. The second disadvantage is that the release mechanism of these devices is often inefficient and sometimes does not work at all. Finally, many of these devices are complicated to use requiring two, three, and sometimes four separate pieces that must be assembled by the fisherman when using the devices. Additionally, the complexity of these release devices inherently make the devices expensive to manufacture and costly to the fisherman.

One release device that exhibits several of the disadvantages noted above, is disclosed within the U.S. Pat. No. 3,816,954 to Bissonette. Bissonette's device includes two separate pieces that are assembled together when the fisherman rigs the fishing lines. The first piece is attached to the down rigger cable through diagonal slots which significantly bend the down rigger cable. The device remains on the cable as long as there is tension within the cable. However, if the weight were to drag along the bottom of a sea or lake bed or heavy currents within the water were to develop, then slack would develop in the cable and the release devices could fall off of the down rigger cable. The second piece of Bissonette's device is attached to the fishing line and must be inserted into the first piece. This second piece can become lost or snagged when released from the main piece. Furthermore, the release of the second piece from the main piece is designed to work best when the fishing line is pulled directly perpendicular from the down rigger line. If the strike occurs above or below the release device it is questionable whether Bissonette's device will release at all.

From the deficiencies noted above there seems to be a significant problem within the prior art of down rigger release devices. The prior art release devices are generally too complicated and don't always function well under all circumstances.

SUMMARY OF THE INVENTION

It is an object of this invention to provide a release device that is one-piece in design and is easy to assemble to the down rigger line and fishing lines.

Another object the invention is to provide a release device that releases under almost any condition when a strike on the fishing line occurs.

It is a further object of the invention to provide a release device that works well with conventional down rigger fishing equipment and requires no additional equipment.

Other objects of the invention will be apparent hereinafter from the specification and from the recital of the appended claims, particularly when read in conjunction with the accompanying drawings.

The present invention comprises a release device made of a single body having a groove at one end for mating with a down rigger cable and opposing hooks at either end of the groove for securing the cable within the groove. At an opposite end of the body is a trigger pivotally attached to the body and having a pair of arms to hold a fishing line therebetween when the trigger is closed into the body and for releasing the device when the trigger is pivoted outwardly away from the body. A resilient catch is provided on the body which holds the trigger in a closed position. The catch is adjustable for varying conditions such as the depth of the device, speed of the boat, length of the line and any other factor causing drag on the line. If the fishing line is struck by a fish, the trigger is released from the catch thereby releasing the line. The release of the line from the down rigger cable notifies the fisherman of which pole has the fish on which line.

DETAILED DESCRIPTION OF THE INVENTION

Figure 1:
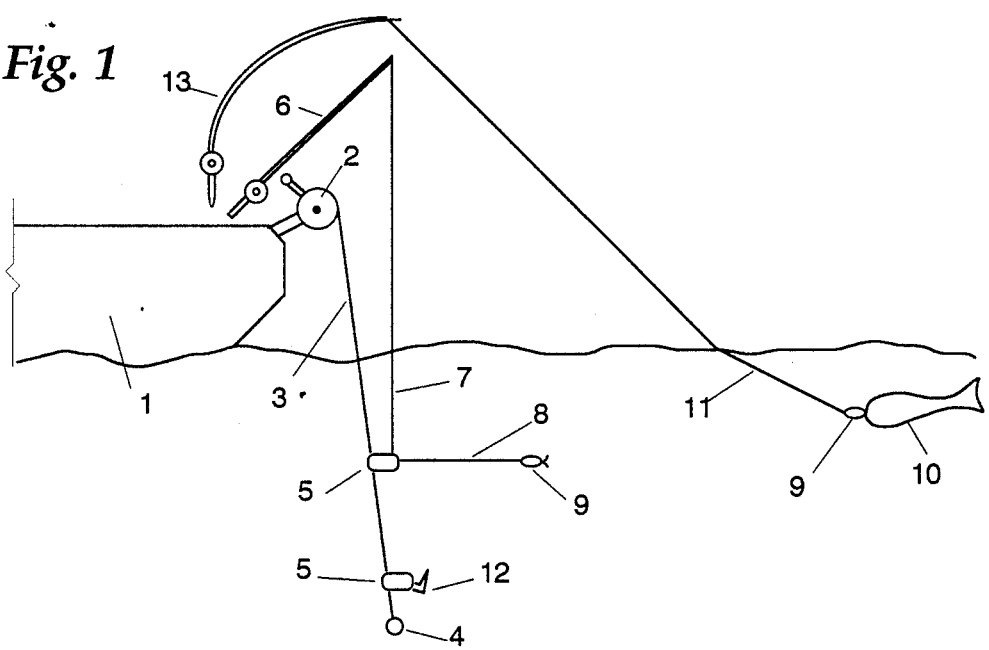
FIG. 1 shows an overall plan view of a down rigger cable system and two poles being fished from a boat with the release device of the present invention.

FIG. 1 shows the operation of the release device of the present invention in its use within a down rigger fishing system. When trolling in a boat 1 a fisherman uses a down rigger reel 2 to lower a cable 3 that has a weight 4 at its end. As the boat moves within the water, the weight keeps the cable 3 in a vertical position or a position close to vertical, as shown. Attached to the cable at various points along the cable are the release devices 5 of the present invention. These release devices are securely fastened to the cables as the reel 2 lowers the cable into the water. Fishing pole 6 is shown rigged to the cable in a manner where the fishing line 7 extends vertically down into the water and is held by the release device 5 such that the end portion 8 of the line 7 extends horizontally outward from the device 5 as the boat moves within the water. It should be noted that the end 8 of line 7 is not a leader, that is separate line, that can be snagged or lost. The line 7 is continuous from the pole 6 to the bait or lure 9. The release device 5 merely holds an intermediate point on the fishing line 7.

In operation, the fishing line 7 is held within the release device until a fish strikes at the bait. A second fishing line 11 is shown released from the lower device 5 and has a fish at its end that took the lure 9. The device releases the line through a pivoted trigger 12. Once the trigger opens the line 11 is released and the fisherman immediately knows that a fish is at the end of the line that is controlled by pole 13.

The simplicity of the overall operation of this release device is one of the reasons the present invention is superior to prior art release devices. Specifically, there is only one piece 5 that can be attached to the down rigger cable anywhere along the cable; there is no additional piece to attach to the fishing line that might get lost or snagged; and the system is very easy to use and rig to the cable and fishing lines.

Figure 2:
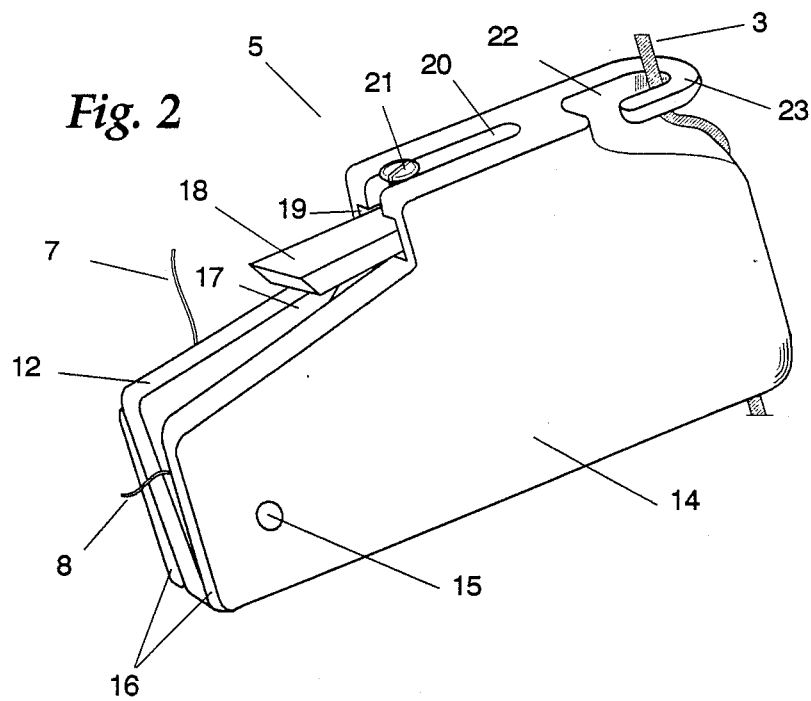
FIG. 2 shows a perspective view of the release device of the present invention.
Figure 4:
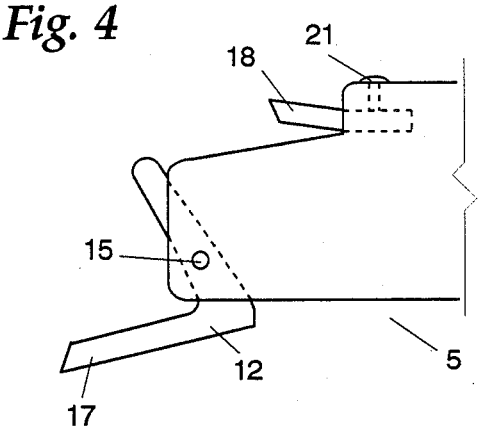
FIG. 4 shows a partial side view of the release device of FIG. 2 in the released position.
Figure 3:
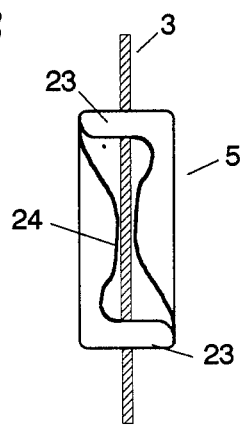
FIG. 3 shows an end view of the release device shown in FIG. 2.

Turning to FIGS. 2–4 a detailed examination of the release device 5 may be had. FIG. 2 shows the overall device 5 having a body 14 which is bifurcated into two parallel legs 16 at one end. The release trigger 12 is mounted upon a pivot 15 between legs 16. The release trigger 12 holds the fishing line 6 between the legs 16. The end 8 of the line trails outwardly from the device 5 in a horizontal manner. The release trigger has a nose 17 that is caught in a closed position by a flexible catch 18. The catch 18 slides within a flanged groove 19 that has an open slit 20 at the top of the body 14. An adjustment screw 21 tightly fastens the catch 18 in a secured position within the groove 19. The catch is adjusted depending on the depth of the device, speed of the boat, length of the line and any other factor causing drag on the line.

The body 14 further includes a pair of opposed hooks 23 that form slots 22 at the end opposite the release trigger end of the device. FIG. 2 shows one of the slots formed by hook 23 while the end view of the device shown in FIG. 3 shows both hooks which curve inwardly from opposite sides of the body 14. Between the hooks 23 is a longitudinal groove 24 in which the down rigger cable 3 is held. To fasten the device to the cable the groove is placed around the cable and the body 14 is turned so that a portion of the cable enters the slot 22 and is held by hook 23 as shown in FIG. 2. The lower hook is subsequently hooked onto the cable by turning the body 14 in an opposite direction to enter the opposite slot (not shown). The combination of the opposing slots with the central groove make for a secure fastening arrangement that is easy to attach and yet will not slip on or from the cable 3.

The non-slip nature of the connection of the device to the cable is important since the adjustment of the tension of any release device is based on the assumption that the device will remain on the cable at a given distance from the boat. In reality, however, many prior art release devices do have a tendency to slip on the cable which makes fishing with any accuracy an impossible task. Another advantage of a release device that does not slip is that the fishing lines may be placed well above the weight on the down rigger cable which allows the cable to drag accidentally upon the bottom surface of the lake or sea bed without snagging the fishing lines. When the prior art devices slip to the bottom of the down rigger line, the hooked fishing lines which they hold have a much higher tendency to snag than the down rigger line which has a weight with a smooth contour at its end. Finally, the connection of the device to the down rigger cable is made without any severe twisting or damaging of the cable. This is distinctly different than most prior art devices that either tie on to the cable or use set screws that damage the cable.

FIG. 4 shows the release device in the released or open position. In this case, a fish has struck the line and the tension of the line against the release trigger 12 has caused the nose 17 to snap past the flexible catch 18 thereby causing the trigger 12 to pivot to its open position and causing the release of the fishing line. The trigger 12 is shaped as a common bell crank lever. This type of lever has two arms and is pivotally mounted midway on one of its arms. The nature of the bell crank causes the trigger 12 to generally rotate to its open position due to the weight of the nose 17 relative to the rest of the trigger. Thus, only when the nose is firmly held by catch 18 will it retain the fishing line. Furthermore, the bell crank allows the device to release when the fish is pulling from an upward, downward or horizontal position due to its off-center and weighted nature. The release mechanism of device 5 makes the present invention a much improved release device over prior art devices. The release device may also be tripped by the fisherman by tugging on the line upwardly from the boat. This allows far more flexibility in down rigger type fishing.

Figure 5:
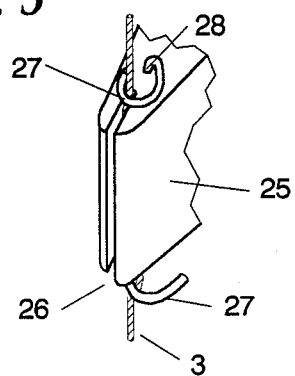
FIG. 5 shows a partial view of a second embodiment of a cable gripping means used in the present invention.

FIG. 5 shows a second embodiment of the fastening means of the release device. In this case, a central groove 26 similar to groove 24 holds the cable 3 in place. Opposed swivel hooks 27 are mounted on a common pivot 28 which is disposed within a hole extending through the body of the release device. These hooks function in the exact same manner as the integral hooks 23 for catching opposite ends of the cable and holding it firmly against the central groove 26.

From the description above, it can be seen that the release device of the present invention is simple in design and easy to use. The device is made of three parts: the body, the trigger, and the catch, all of which can be made of injection molded plastic which greatly reduces the manufacturing cost of the device. In use, the device corrects many of the problems associated with using down rigger release devices such as slippage on the cable, cumbersome assembly, ineffective release mechanisms, and easily snagged fishing lines. The device is a significant improvement within the art of down rigger fishing.

It should be apparent that many modifications could be made to the release device which would still be encompassed within the spirit of the present invention. It is intended that all such modifications may fall within the scope of the appended claims.

What is claimed is:

1. A release device for attachment to a down rigger cable for holding and releasing a fishing line, the release device comprising:

a body having a release end and a cable attachment end opposite said release end, said body made of one piece;

a means to securely hold said body to the down rigger cable, said securing means including means to prevent said body from slipping on the cable and said securing means including means to prevent twisting damage to the cable;

a movable release trigger attached to said release end of said body, said trigger capable of moving between two positions, a first position wherein said trigger is closed and holds the fishing line to said release device and a second position wherein said trigger is open and releases the fishing line in response to a pull on the fishing line;

said securing means comprises a longitudinal groove at said cable attachment end of said body, said securing means further comprising means for holding the down rigger cable within said groove;

said holding means further comprises at least one hook at one end of said groove for hooking the down rigger cable into a slot formed by said hook.

2. A release device for attachment to a down rigger cable for holding and releasing a fishing line, the release device comprising:

a body having a release end and a cable attachment end opposite said release end, said body made of one piece;

a means to securely hold said body to the down rigger cable, said securing means including means to prevent said body from slipping on the cable and said securing means including means to prevent twisting damage to the cable;

a movable release trigger attached to said release end of said body, said trigger capable of moving between two positions, a first position wherein said trigger is closed and holds the fishing line to said release device and a second position wherein said trigger is open and releases the fishing line in response to a pull on the fishing line;

said securing means comprises a longitudinal groove at said cable attachment end of said body, said securing means further comprising means for holding the down rigger cable within said groove;

said holding means further comprises a pair of hooks at opposite ends of said groove for hooking the down rigger cable into slots formed by said hooks.

* * * * *